United States Patent [19]

Takiguchi

[11] Patent Number: 5,982,718
[45] Date of Patent: Nov. 9, 1999

[54] VERIFYING DATA BY CONTROLLING THE GAIN OF AN AMPLIFYING MEANS ACCORDING TO A WINDOW WIDTH COMPARATOR

[75] Inventor: Taizo Takiguchi, Kanagawa, Japan

[73] Assignee: Sony Corporation, Tokyo, Japan

[21] Appl. No.: 09/037,487

[22] Filed: Mar. 10, 1998

[30]       Foreign Application Priority Data

Mar. 13, 1997  [JP]  Japan .................................. 9-059515

[51] Int. Cl.⁶ .................................................. G11B 20/18
[52] U.S. Cl. ............................... 369/32; 369/59; 369/58; 369/124
[58] Field of Search ............................... 369/32, 54, 58, 369/47, 48, 124, 53, 59; 360/51

[56]             References Cited

U.S. PATENT DOCUMENTS

| | | | |
|---|---|---|---|
| 5,502,699 | 3/1996 | Yamasaki et al. ........................ | 369/48 |
| 5,717,671 | 2/1998 | Aramaki .................................... | 369/48 |
| 5,748,590 | 5/1998 | Iwasaki et al. ........................... | 369/58 |
| 5,790,491 | 8/1998 | Jaquette et al. ........................... | 369/54 |
| 5,864,531 | 1/1999 | Horigome ................................. | 369/124 |

*Primary Examiner*—Ali Neyzari
*Assistant Examiner*—Kim-Kwok Chu
*Attorney, Agent, or Firm*—Limbach & Limbach L.L.P.

[57]                ABSTRACT

In a disc drive device upon recording, the writing of data is executed and thereafter the reading of data is executed to verify, i.e., make a check as to whether the written data can be properly read out. In this case, the gain of a gain control amplifier for amplifying a reproduced signal is set so as to be lower than usual and a window width of a window comparator is set so as to be greater than usual. An error rate in a bubble shaped region in which the amplitude of the reproduced signal is small, is rendered high. Thus, verify can be taken as NG when recording power falls within the bubble region. Verify is determined based on RESYNC bytes added every predetermined data intervals, i.e., detected information about patterns for data having the minimum and maximum inversion intervals as well as on error information. As a result, verify can be reliably taken as NG even when the recording power is placed in a region between the bubble shaped region and a normal region. Thus, the accuracy of verify can be enhanced.

30 Claims, 7 Drawing Sheets

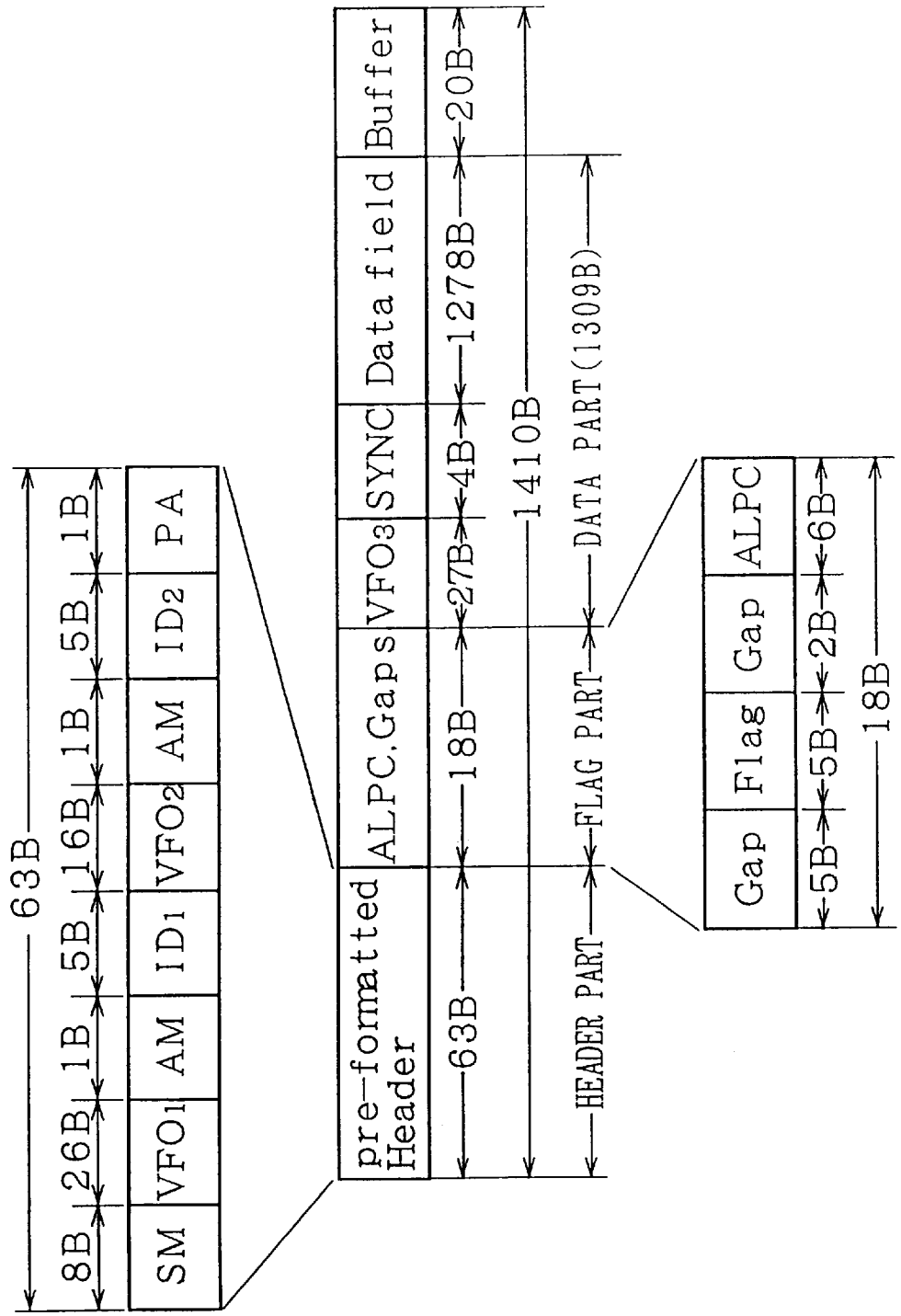

FIG. 3

RECORDING DIRECTION →

| COLUMN NO. j | | | | 0 | 1 | 2 | 3 | 4 | 5 | 6 | 7 | 8 | 9 | ROW NO. i |
|---|---|---|---|---|---|---|---|---|---|---|---|---|---|---|
| SB 1 | SB 2 | SB 3 | SB 4 | D1 | D2 | D3 | D4 | D5 | D6 | D7 | D8 | D9 | D10 | 103 |
| | | | | D11 | D12 | D13 | D14 | D15 | D16 | D17 | D18 | D19 | D20 | 102 |
| | | | | D21 | D22 | D23 | D24 | D25 | D26 | D27 | D28 | D29 | D30 | 101 |
| RS 1 | RS 1 | | | D31 | D32 | D33 | D34 | D35 | D36 | D37 | D38 | D39 | D40 | 100 |
| | | | | D41 | D42 | D43 | D44 | D45 | D46 | D47 | D48 | D49 | D50 | 99 |
| | | | | D51 | D52 | D53 | D54 | D55 | D56 | D57 | D58 | D59 | D60 | 98 |
| RS 2 | RS 2 | | | D61 | D62 | D63 | D64 | D65 | D66 | D67 | D68 | D69 | D70 | 97 |
| | | | | D981 | D982 | D983 | D984 | D985 | D986 | D987 | D988 | D989 | D990 | 5 |
| RS33 | RS33 | | | D991 | D992 | D993 | D994 | D995 | D996 | D997 | D998 | D999 | D1000 | 4 |
| | | | | D1001 | D1002 | D1003 | D1004 | D1005 | D1006 | D1007 | D1008 | D1009 | D1010 | 3 |
| | | | | D1011 | D1012 | D1013 | D1014 | D1015 | D1016 | D1017 | D1018 | D1019 | D1020 | 2 |
| RS34 | RS34 | | | D1021 | D1022 | D1023 | D1024 | P1,1 | P1,2 | P1,3 | P1,4 | P2,1 | P2,2 | 1 |
| | | | | P2,3 | P2,4 | P3,1 | P3,2 | P3,3 | P3,4 | C1 | C2 | C3 | C4 | 0 |
| | | | | E1,1 | E2,1 | E3,1 | E4,1 | E5,1 | E6,1 | E7,1 | E8,1 | E9,1 | E10,1 | -1 |
| RS35 | RS35 | | | E1,2 | E2,2 | E3,2 | E4,2 | E5,2 | E6,2 | E7,2 | E8,2 | E9,2 | E10,2 | -2 |
| | | | | E1,3 | E2,3 | E3,3 | E4,3 | E5,3 | E6,3 | E7,3 | E8,3 | E9,3 | E10,3 | -3 |
| RS39 | RS39 | | | E1,14 | E2,14 | E3,14 | E4,14 | E5,14 | E6,14 | E7,14 | E8,14 | E9,14 | E10,14 | -14 |
| | | | | E1,15 | E2,15 | E3,15 | E4,15 | E5,15 | E6,15 | E7,15 | E8,15 | E9,15 | E10,15 | -15 |
| | | | | E1,16 | E2,16 | E3,16 | E4,16 | E5,16 | E6,16 | E7,16 | E8,16 | E9,16 | E10,16 | -16 |

104 ROWS
16 ROWS

D1~D1024 : DATA BYTES
P1,2~P3,4 : CONTROL BYTES
C1~C4 : CRC BYTES
E1,1~E10,16 : ECC BYTES
SB1~SB4 : SYNC BYTES
RS1~RS39 : RESYNC BYTES

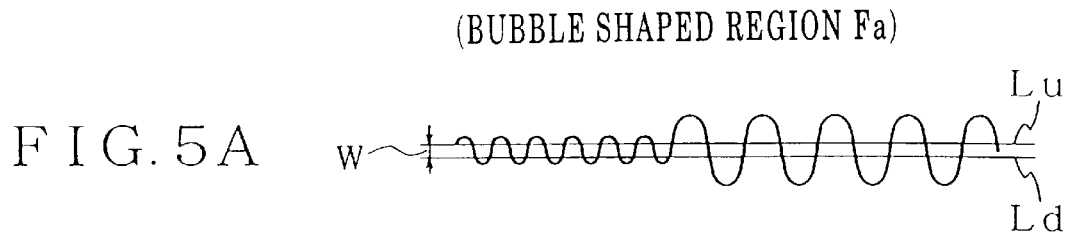
FIG. 5A (BUBBLE SHAPED REGION Fa)
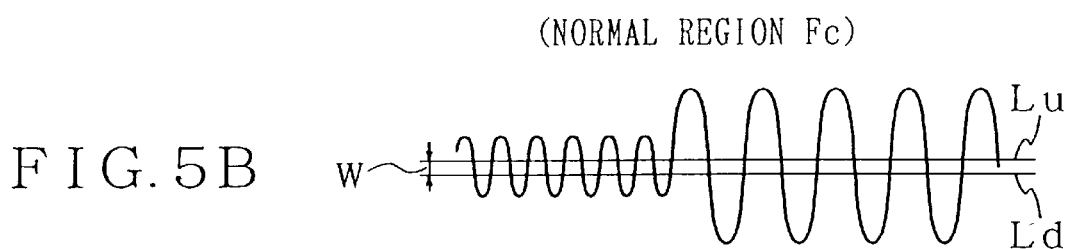
FIG. 5B (NORMAL REGION Fc)
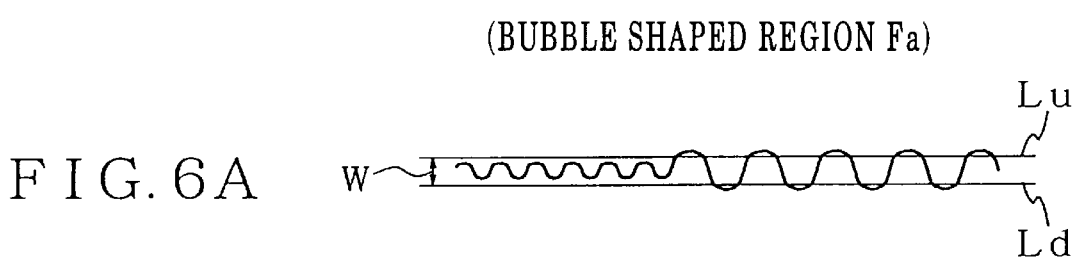
FIG. 6A (BUBBLE SHAPED REGION Fa)
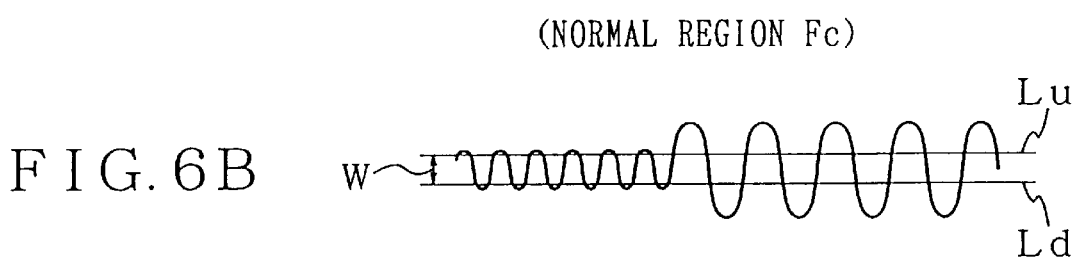
FIG. 6B (NORMAL REGION Fc)

FIG. 8A (Dr)
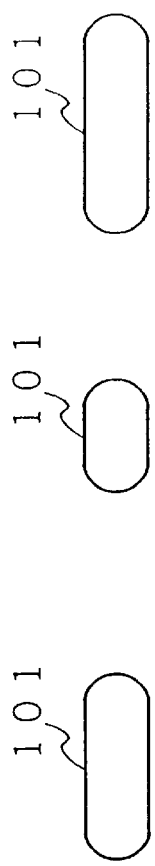
FIG. 8B  NORMAL RECORDING POWER
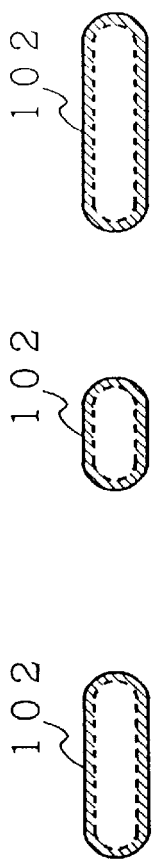
FIG. 8C  POWER IN REGION Fb (IMMEDIATELY AFTER RECORDING)
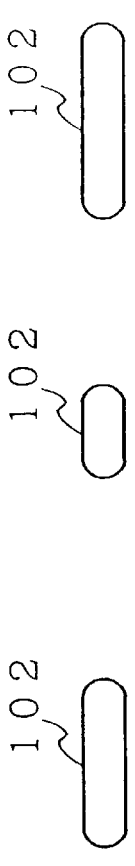
FIG. 8D  POWER IN REGION Fb (TWO OR THREE DAYS LATER)

VERIFYING DATA BY CONTROLLING THE GAIN OF AN AMPLIFYING MEANS ACCORDING TO A WINDOW WIDTH COMPARATOR

BACKGROUND OF THE INVENTION

1. Field of the Invention

This invention relates to a disc drive device suitable for application to a write-once, read-many-times disc device or the like, for example. This invention relates more specifically to a disc drive device wherein upon verify for checking whether data written into a disc medium can be properly read out, for example, an amplification factor of a reproduced signal is set smaller than usual, a window width of a comparator for bringing the reproduced signal into binary form is set larger than usual, and a verify check is made based on the detected number of synchronous pattern codes from the reproduced signal as well as on error information about read data, whereby the accuracy of verify is enhanced.

2. Description of the Related Art

When a disc medium such as an optical disc, a magneto-optic disc or the like suffers large or many defects on its recording surface, there may be cases in which even if an ECC (Error Correction Code) corresponding to a redundant word is added to data and the data is written into the disc medium, error correction cannot be made thereto so that the data cannot be read out properly. Therefore, a process for checking whether the data written into the disc medium can be read properly, is executed. This process is called "verify". When the data cannot be read correctly upon verify, a process for writing the data into another area or region (alternate region) is executed.

Meanwhile, a WORM (Write Once Read Many type) disc using a pit generation system for recording marks thereon, for example, has the potential that when data is written into the disc with low recording power (mark edge recording is done), marks such as pits or the like recorded after the elapse of a few days in time deteriorate, and the data which can be properly read immediately after the writing of the data cannot thereafter be read.

FIG. 7 shows the typical relationship between recording power, an error rate and signal amplitude employed in the WORM disc. That is, a solid line a indicates the relationship between recording power and an error rate immediately after the recording of data, a broken line b indicates the relationship between recording power and an error rate after a few days since the recording, and a solid line c indicates the relationship between recording power and the amplitude of a reproduced signal immediately after the recording. Ro indicates the upper limit of an error-correctable error rate.

There may be cases in which when the recording power is placed in a small bubble shaped region Fa, the error rate is low immediately after the recording and the error correction is made possible well. Since reflectivity changes due to the occurrence of a phase change or the like although pits are not defined in the WORM disc as marks, for example, it is possible to read data. However, when the recording power falls within the bubble shaped region Fa, the phase change is restored to the original state a few days later and even recording traces of data are not left behind, whereby the data can be read. Incidentally, the amplitude of a reproduced signal at the time that the recording power lies within the bubble shaped region Fa, results in one-fourth or less the amplitude of a reproduced signal at the time that the recording power lies within a normal region Fc.

Even when the recording power is placed within a region Fb between the bubble shaped region Fa and the normal region Fc, the error rate is low immediately after the recording and the data can be read in a manner similar to the case in which the recording power lies within the bubble shaped region Fa. However, there is a potential that the error rate becomes high a few days later and the data cannot be read. This reason is considered as follows:

When data Dr shown in FIG. 8A is recorded with the recording power in the normal region Fc by using the pit generation system, for example, a pit 101 set as a record mark is defined in the WORM disc in a length corresponding to the data Dr as shown in FIG. 8B. On the other hand, when the data Dr shown in FIG. 8A is recorded with the recording power in the region Fb, a pit 102 used as a record mark is defined in the WORM disc immediately after the recording as shown in FIG. 8C. However, the periphery (shown by hatching) of the pit 102 remains in a phase-changed state. This portion is restored to the original state with the elapse of time and the pit 102 becomes short a few days later as shown in FIG. 8D, thus making it impossible to read the data. Incidentally, the amplitude of the reproduced signal at the time that the recording power lies within the region Fb, is not so reduced as compared with the case in which the recording power is placed in the normal region Fc.

SUMMARY OF THE INVENTION

With the foregoing points in view, it is therefore an object of this invention to make it possible to determine the written data is impossible to read when recording power is lower than usual and as the time elapses, as NG upon verify, thereby enhancing the accuracy of verify.

According to one aspect of this invention, for achieving the above object, there is provided a disc drive device comprising data writing means for recording marks corresponding to data on a disc medium to thereby write the data therein, data reading means for reading the data, based on the marks recorded on the disc medium, and verify means for checking whether the marks written into the disc medium by the data writing means are capable of being properly read out by the data reading means. The data reading means includes signal reproducing means for obtaining a reproduced signal from the corresponding marks recorded on the disc medium by an optical head, amplifying means for amplifying the reproduced signal, a window comparator for bringing a signal outputted from the amplifying means into binary form, reproduced signal processing means for processing a signal outputted from the window comparator to thereby obtain read data, and control means for controlling the gain of the amplifying means so as to be smaller than that at the time of normal data reproduction or controlling a window width of the window comparator so as to be greater than that at time of the normal data reproduction when the verify means performs the check.

According to another aspect of this invention, there is provided a disc drive device comprising data writing means for recording marks corresponding to data on a disc medium to thereby write the data therein, data reading means for reading the data, based on the marks recorded on the disc medium and verify means for checking whether the marks written into the disc medium by the data writing means are capable of being properly read out by the data reading means. In this case, a plurality of synchronous pattern codes are added to the data written into the disc medium by the data writing means in distributed form. The data reading means includes signal reproducing means for obtaining a reproduced signal from the marks recorded on the disc medium by an optical head, amplifying means for amplifying the reproduced signal, digitizing means for bringing a signal outputted from the amplifying means into binary form, code detecting means for detecting the synchronous pattern codes in response to a signal outputted from the digitizing means, and reproduced signal processing means for processing the output signal of the digitizing means to thereby obtain read data. The verify means performs the check based on the number of the synchronous pattern codes detected by the code detecting means.

According to a further aspect of this invention, there is provided a recording and reproducing device for recording data on a disc medium and reproducing the data from the recording medium, comprising data recording means for recording data on the disc medium, data reproducing means for reproducing the data recorded on the disc medium, verify means for verifying whether the marks written into the disc medium by the data recording means are capable of being properly read by the data reproducing means, and control means for controlling the verify means so that conditions under which the signal reproduced by the data reproducing means is verified, are rigorously met in order to prevent the data recorded on the disc medium from being incapable of being read due to a phase change incident to a change over time after the recording of the data on the disc medium.

Upon writing data, marks corresponding to the data are recorded on the disc medium. For example, mark edge recording is employed in a WORM disc in accordance with a pit generation system. Upon reading the data, a reproduced signal is obtained from the marks recorded on the disc medium through the optical head. The so-obtained reproduced signal is amplified by the amplifying means and thereafter brought into binary form by the digitizing means. In this case, for example, a window comparator is used as the digitizing means to prevent the influence of noise. That is, a threshold value on the side high in level with respect to a center level of the reproduced signal and a threshold value on the side low in level with respect to the center level thereof are alternately used as already known in the art.

In order to avoid the slip of data, for example, a plurality of synchronous pattern codes (RESYNC) are added to the data written into the disc medium in distributed form. The synchronous pattern codes are eliminated from the signal represented in binary form and thereafter, demodulation and error correction processes are effected thereon to thereby obtain read data.

When recording power is placed in a bubble shaped region Fa, an error rate is raised a few days later so that the data properly read immediately after its recording cannot be read. Therefore, the gain of the amplifying means is controlled so as to be smaller than that at normal data reproduction and a window width of the widow comparator is controlled so as to be greater than that at the normal data reproduction upon verify for making a check as to whether the data written into the disc medium immediately after its recording can be properly read out.

The amplitude of a reproduced signal at the time that the recording power lies within the bubble shaped region Fa, results in one-fourth or less the amplitude of a reproduced signal at the time that the recording power falls within a normal region Fc. Therefore, the gain of the amplifying means is reduced and the window width of the window comparator is increased. By doing so, the error rate is rendered high so that the data cannot be read out. Thus, the writing of the data at the time that the recording power lies within the bubble shaped region Fa, can be taken as NG upon verify.

When the recording power lies within a region Fb between the bubble shaped region Fa and the normal region Fc, the error rate becomes high a few days later, so that the data properly read immediately after its recording has the potential for becoming impossible of reading. The amplitude of a reproduced signal at the time that the recording power lies within the region Fb, is not so reduced as compared with that at the time that the recording power is placed in the normal region Fc. Therefore, the reduction in the gain of the amplifying means and the increase in the window width of the window comparator as in the case of the aforementioned bubble shaped region Fa make it difficult to determine the writing of the data at the time that the recording power lies within the region Fb, as NG upon verify.

When the recording power lies within the region Fb, all the pits defined in the disc medium as marks so as to correspond to data become short as compared with the case where the recording power falls within the normal region Fc. In this case, the rates at which the lengths of the pits become short, vary with mark lengths in random patterns having various mark lengths and hence the patterns are apt to cause errors. Therefore, there is a high possibility that when the errors arise substantially at a time immediately after the recording, the lengths of the pits will change later even if an error correcting process may be allowed, so that the data will not be read out. Thus, the number of the errors per correction sequence is checked upon verify and considerably error-produced ones are eliminated (inclusive of narrowly error-correctable those). It is thus possible to achieve verify high in accuracy with respect to the random patterns.

However, since each mark length becomes short on a unitary basis in a single pattern having single-type mark lengths, data might be reproduced without any error at a time immediately after its recording. Therefore, only the check for the number of the errors per correction sequence upon verify makes it impossible to determine, as NG, all the writing of data at the time that the recording power lies within the region Fb.

Thus, the number of the synchronous pattern codes (RESYNC) detected from the signal represented in binary form is checked upon verify for making a check as to whether the data written into the disc medium immediately after its recording can be read properly. The synchronous pattern code is e.g., data having the minimum and maximum inversion intervals. The detected number of synchronous pattern codes is reduced depending on the writing of data at the time that the recording power lies within the region Fb. Therefore, the detected number of synchronous pattern codes is checked upon verify to make it possible to reliably determine the writing of the data at the time that the recording power lies within the region Fb, as NG upon verify.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a diagram illustrating a sector format of a 130 mm-type WORM disc whose user data is given by 1024 bytes/sector;

FIG. 3 is a diagram depicting a configuration of a data field having user data represented in the form of 1024 bytes/sector;

FIGS. 5A and 5B are diagrams typically showing the relationship between the amplitude of a reproduced signal and a window width of a comparator at the time that the gain of an amplifier and the window width thereof are placed in a normal mode, respectively;

FIGS. 6A and 6B are diagrams typically showing the relationship between the amplitude of a reproduced signal and a window width of the comparator at the time that the gain of the amplifier and the window width thereof are placed in a verify mode, respectively;

FIGS. 8A, 8B, 8C and 8D are diagrams for describing the reason why marks cannot be read with the elapse of time when recording power lies within a region defined between a bubble shaped region and a normal region, respectively.

DETAILED DESCRIPTION OF THE PREFERRED EMBODIMENTS

Figure 1:
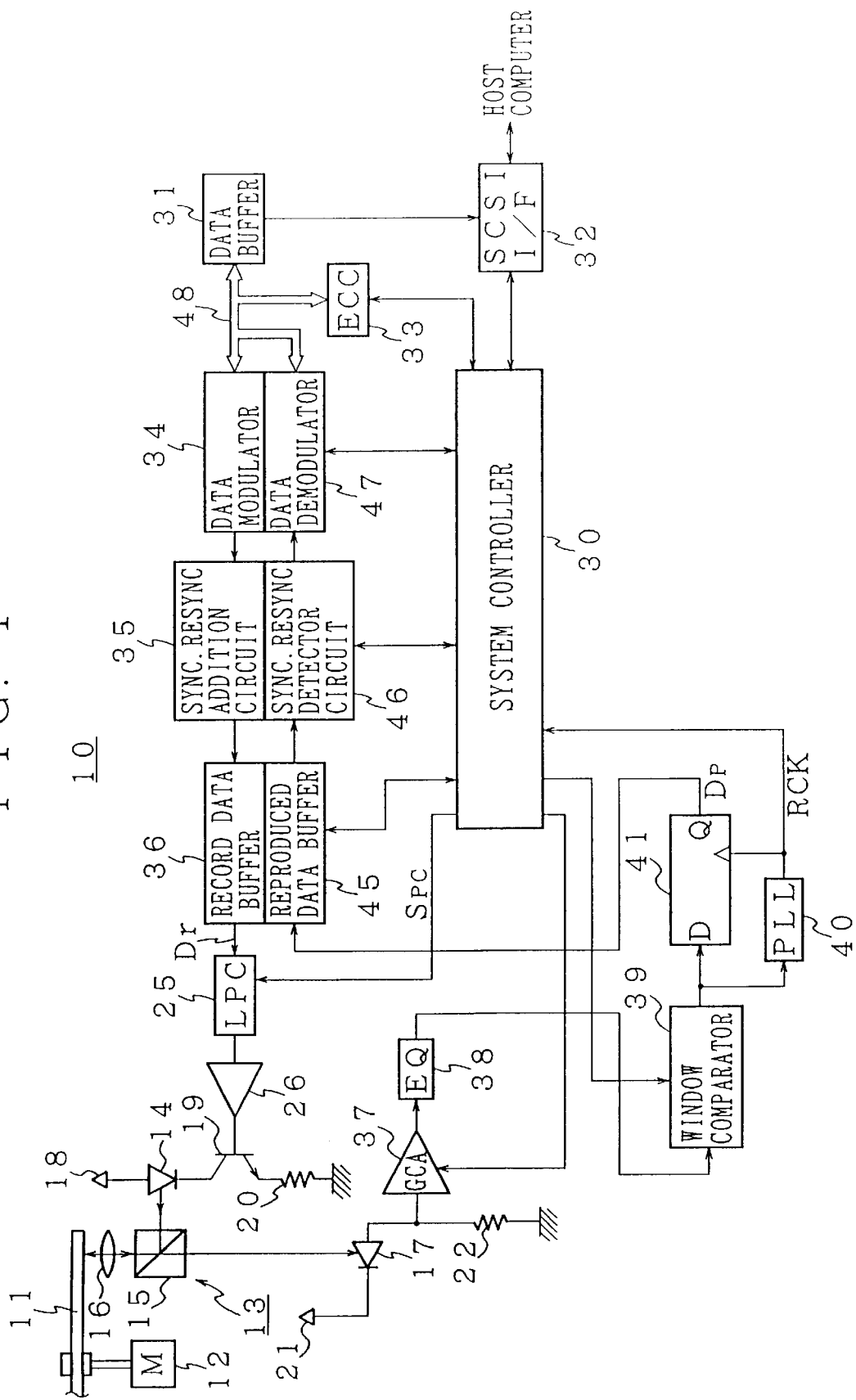
FIG. 1 is a block diagram showing a configuration of a WORM disc drive device according to an embodiment of the present invention.

Preferred embodiments of the present invention will hereinafter be described with reference to the accompanying drawings. FIG. 1 shows a configuration of a WORM disc drive device 10 according to one embodiment of the present invention.

The disc drive device 10 has a spindle motor 12 for rotatably driving a WORM disc 11 at a constant angular velocity. The WORM disc 11 is a 130 mm-type WORM disc in which user data is represented in the form of 1024 bytes/sector. As shown in FIG. 2, the WORM disc 11 has a sector format comprised of a header part of 63 bytes, a flag part of 18 bytes, a data part of 1309 bytes and a buffer of 20 bytes.

The header part is an area or region indicative of a physical block address on a disc, of each sector and is pre-formatted on a substrate in advance according to bits. The flag part is an area or region for writing a flag indicative of the state of data within each sector. The data part is an area or region for writing user data. The buffer is an area or region used for a margin of a variation in the rotation of the disc. The buffer is provided so as to avoid the overlapping of data with addresses even if displacements occur due to a rotating jitter or the like upon recording.

The header part starts from a leading pattern called "SM (Sector Mark)". In the header part, an address information pattern comprised of a combination of a VFO (Variable Frequency Oscillator) for supplying the rotational phase of an actually-rotated disc, an AM (Address Mark) for supplying a start position of address data, and an ID (Identifier) including a track number and a sector number used as identification signals, is repeated twice. The header part is terminated at a PA (Postamble).

The same identification signal is repeatedly written in two ID ($ID_1$ and $ID_2$). A CRC (Cyclic Redundancy Check) code for detecting errors of the track number and the sector number is also written in each ID in addition to the identification signals for the track number and the sector number.

The flag part includes an ALPC (Automatic Laser Power Control) corresponding to a test portion for adjusting or controlling the level of laser power, and the like as well as a FLAG indicative of the execution of writing.

The data part includes a region for writing a VFO (Variable Frequency Oscillator) corresponding to a continuous data pattern for PLL, and a data field used as a region for writing user data in addition to a region for writing a SYNC corresponding to a synchronizing signal for the data part. In addition to the user data, a control byte for performing a process, so-called defect process for writing data into an alternate sector when a sector desired to originally write the data therein is defective, an ECC (Error Correction Code) byte corresponding to an error-correcting redundant word, a CRC (Cyclic Redundancy Check) code for performing error detection, and a RESYNC byte corresponding to a synchronizing special code pattern are written into the data field.

FIG. 3 shows a configuration of the data field referred to above. That is, pieces of data D1 through D1024 are successively arranged in a row direction with lengths of 10 bytes in a column direction. Control bytes P1,1 through P3,4 and CRC (Cyclic Redundancy Check) bytes C1 through C4 are arranged following the data D1024. Further, error-correction codes (parity) are generated in the row direction and added as ECC (Error Correction Code) bytes E1, 1 through E10, 16. That is, 120 bytes lying in the row direction constitute a one-correction sequence. Further, SYNC bytes SB1 through SB4 of 4 bytes are added immediately before the data D1 and RESYNC bytes RS1 through RS39 are added by two bytes every 30 bytes.

Further, the disc drive device 10 has an optical head 13 comprised of a laser diode 14, a beam splitter 15, an objective lens 16, a photodiode 17, etc. In this case, the anode of the laser diode 14 is electrically connected to a power terminal 18, whereas the cathode thereof is electrically connected to the collector of an NPN transistor 19. Further, the emitter of the NPN transistor 19 is grounded via a current-limiting resistor 20. On the other hand, the cathode of the photodiode 17 is electrically connected to a power terminal 21, whereas the anode thereof is electrically grounded via a current-detecting resistor 22. A laser beam LB outputted from the laser diode 14 is reflected by the beam splitter 15 so as to be applied to a recording surface of the WORM disc 11. Further, the laser beam reflected from the recording surface of the WORM disc 11 is applied to the photodiode 17 through the beam splitter 15.

Moreover, the disc drive device 10 has a laser power control circuit 25 for outputting a drive signal for driving the laser diode 14 of the optical head 13, and a drive amplifier 26 for amplifying the drive signal outputted from the laser power control circuit 25 and supplying the amplified drive signal to the base of the NPN transistor 19. The laser power control circuit 25 is supplied with a power control signal SpC from a system controller to be described later so that the power of the laser beam outputted from the laser diode 14 is controlled to the optimum power upon recording and reproduction.

Upon recording (writing data), a record data buffer to be described later supplies record data Dr to the laser power control circuit 25 from which a drive signal corresponding to the record data Dr is outputted. Therefore, a laser beam subjected to light-intensity modulation in association with the record data Dr is outputted from the laser diode 14 upon recording, so that a mark corresponding to the record data Dr is recorded on the WORM disc 11. In this case, mark edge recording is adopted and the mark is recorded in accordance with a pit generation system. Incidentally, the drive signal is outputted from the laser power control circuit 25 so that the laser beam is continuously outputted from the laser diode 14 at timing provided to scan each of the header part and the flag part even upon the reproduction (data reading) and recording.

The disc drive device 10 includes a system controller 30 comprised of a CPU (Central Processing Unit), for controlling the entire system, a data buffer 31, and a SCSI (Small Computer System Interface) interface 32 for performing the transfer of data and commands between the disc drive device and a host computer.

The disc drive device 10 has an ECC (Error Correction Code) circuit 33 for performing an error-correction code adding process on written data supplied from the host computer through the SCSI interface 32 and effecting an error correction process on data outputted from a data demodulator, and a data modulator 34 for effecting a modulating process on the written data to which an error correction code is added by the ECC circuit 33.

The disc drive device 10 includes a SYNC·RESYNC addition circuit 35 for adding the SYNC bytes SB1 through SB4 and RESYNC bytes RS1 through RS39 (see FIG. 3) to data outputted from the data modulator 34 to thereby obtain record data Dr, and a record data buffer 36 for temporarily storing the record data Dr obtained from the SYNC·RESYNC addition circuit 35. Each of the RESYNC bytes is equivalent to a synchronous pattern having the minimum and maximum inversion intervals.

The disc drive device 10 has a gain control amplifier (GCA) 37 for amplifying a reproduced signal obtained at a point where the photodiode 17 and the resistor 22 constituting the optical head 13 are connected, an equalizer circuit 38 for compensating for a frequency characteristic of the reproduced signal amplified by the gain control amplifier 37, a window comparator 39 for bringing the reproduced signal whose frequency characteristic has been subjected to compensation by the equalizer circuit 38, into binary form, a PLL (Phase-Locked Loop) circuit 40 for reproducing a clock signal RCK by referring to the signal represented in binary form, which is outputted from the window comparator 39, and a D flip-flop 41 for latching the signal represented in binary form, which is outputted from the window comparator 39, in response to the clock signal RCK reproduced by the PLL circuit 40. The gain of the gain control amplifier 37 and a window width w of the window comparator 39 are controlled by the system controller 30. Further, the clock signal RCK reproduced by the PLL circuit 40 is also supplied to the system controller 30 where it is used in an on-reproduction process.

In this case, a threshold value Lu on the side high in level with respect to the center level of the reproduced signal and a threshold value Ld on the side low in level with respect to the center level thereof are alternately used in the window comparator 39. If the reproduced signal becomes greater than the threshold value Lu when the state of an output is represented by "0", for example, then the state of the output is changed to "1". If the reproduced signal becomes smaller than the threshold value Ld when the state of the output is given by "1", then the state of the output is changed to "0". The difference in level between the threshold values Lu and Lb is equal to the window width w. Incidentally, for example, a center level of a reproduced signal of $VFO_3$ in a data part with a mark of 2T (where T: time interval of one channel bit) recorded therein is used as the center level of the reproduced signal.

The disc drive device 10 includes a reproduced or reproduced data buffer 45 for temporarily recording the reproduced data Dp outputted from the D flip-flop 41, a SYNC·RESYNC detector circuit 46 for detecting the SYNC bytes SB1 through SB4 and RESYNC bytes RS1 through RS39 from the reproduced data Dp, and a data demodulator 47 for effecting a demodulating process on data obtained by eliminating the SYNC bytes and RESYNC bytes from the reproduced data Dp. The data buffer 31, ECC circuit 33, data modulator 34 and data demodulator 47 are electrically connected to one another by a data bus 48.

Pieces of detected information about RESYNCs in respective sectors, which are detected by the SYNC·RESYNC detector circuit 46, are supplied to the system controller 30 where they are utilized for a check at verify to be described later. Further, pieces of information about the numbers of errors produced in respective correction sequences obtained in the process of performing the error correction process by the ECC circuit 33 are also supplied to the system controller 30 where they are used for the check at verify to be described later.

The operation of the WORM disc drive device 10 shown in FIG. 1 will be explained.

A description will first be made of the operation of the WORM disc drive device 10 at the reproduction (data reading) upon which a data read command is supplied from the host computer to the system controller 30. Upon the reproduction, the gain of the gain control amplifier 37 and the window width w of the comparator 39 are placed in a normal mode.

A reproduced signal obtained at the connecting point between the photodiode 17 and the resistor 22 of the optical head 13 is amplified by the gain control amplifier 37. Further, the equalizer circuit 38 compensates for a frequency characteristic of the reproduced signal. Thereafter, the so-processed reproduced signal is converted into a signal represented in binary form by the comparator 39, followed by supply to the D flip-flop 41. The D flip-flop 41 latches the signal represented in binary form in response to a clock signal RCK reproduced by the PLL circuit 40 to obtain reproduced data Dp.

The reproduced data Dp is supplied to the data demodulator 47 through the reproduced data buffer 45 and the SYNC·RESYNC detector circuit 46, where it is subjected to a demodulating process. Further, the ECC circuit 33 effects an error correction process on data outputted from the data demodulator 47 to obtain read data. Thereafter, the read data is temporarily stored in the data buffer 31 and thereafter transmitted to the host computer through the SCSI interface 32 in predetermined timing.

A description will next be made of the operation of the WORM disc drive device 10 at recording (data writing) upon which a data write command is supplied from the host computer to the system controller 30. In a verify mode in this case, the gain of the gain control amplifier 37 is set so as to be lower than normal and the window width w of the comparator 39 is set so as to be greater than normal. A description will be made of the gain of the gain control amplifier 37. That is, if the gain thereof is assumed to be 0 dB in a normal mode, for example, then the gain is taken as −3 dB in the verify mode. A description will be made of the window width w of the comparator 39. That is, when recording power lies within a normal region Lc and the amplitude of a reproduced signal of $VFO_3$ in a data part supplied to the comparator 39 is 250 mV, for example, the window width w is set to 30 mV in the normal mode and 60 mV in the verify mode.

Figure 4:
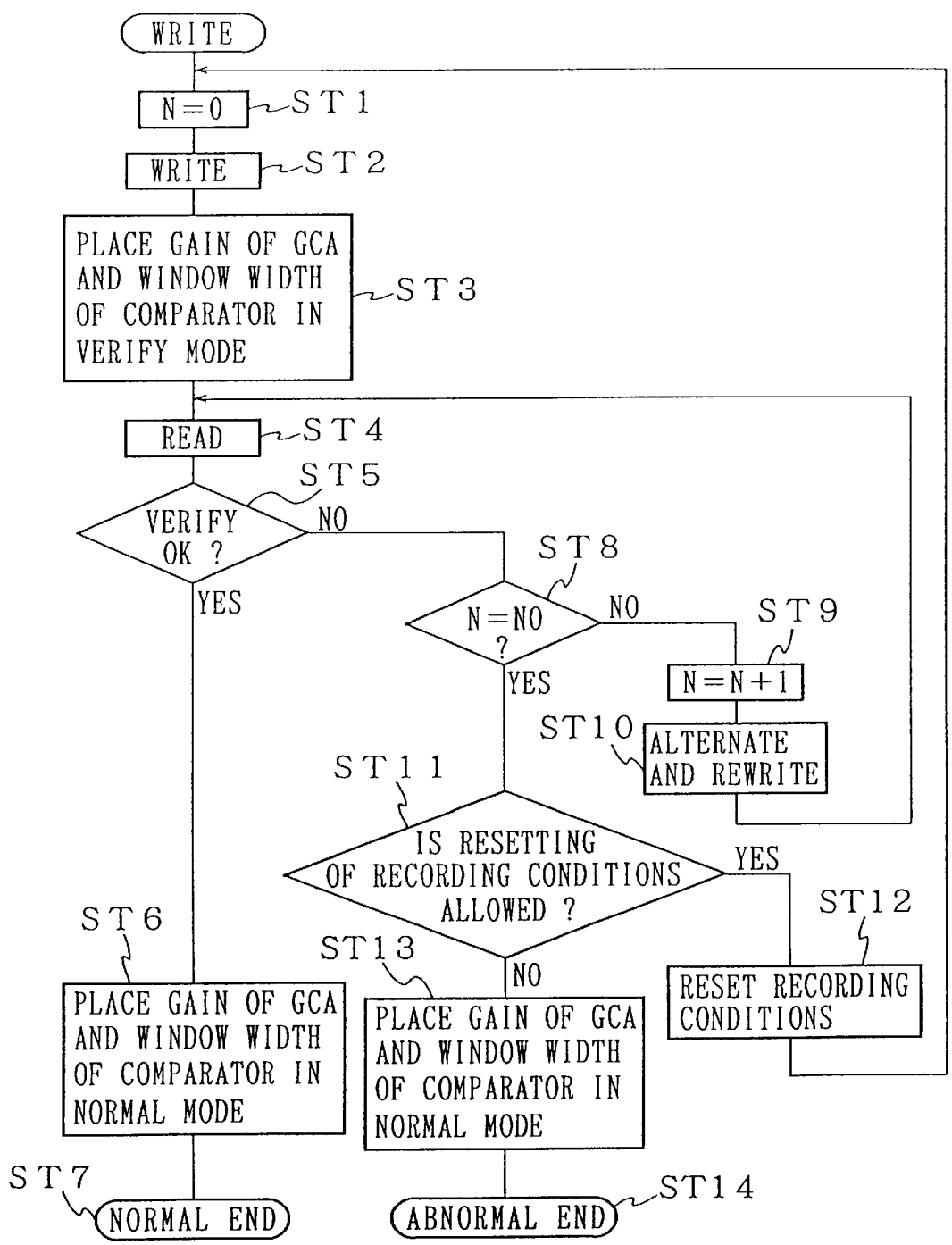
FIG. 4 is a flowchart for describing the operation of a system controller at recording.
Figure 7:
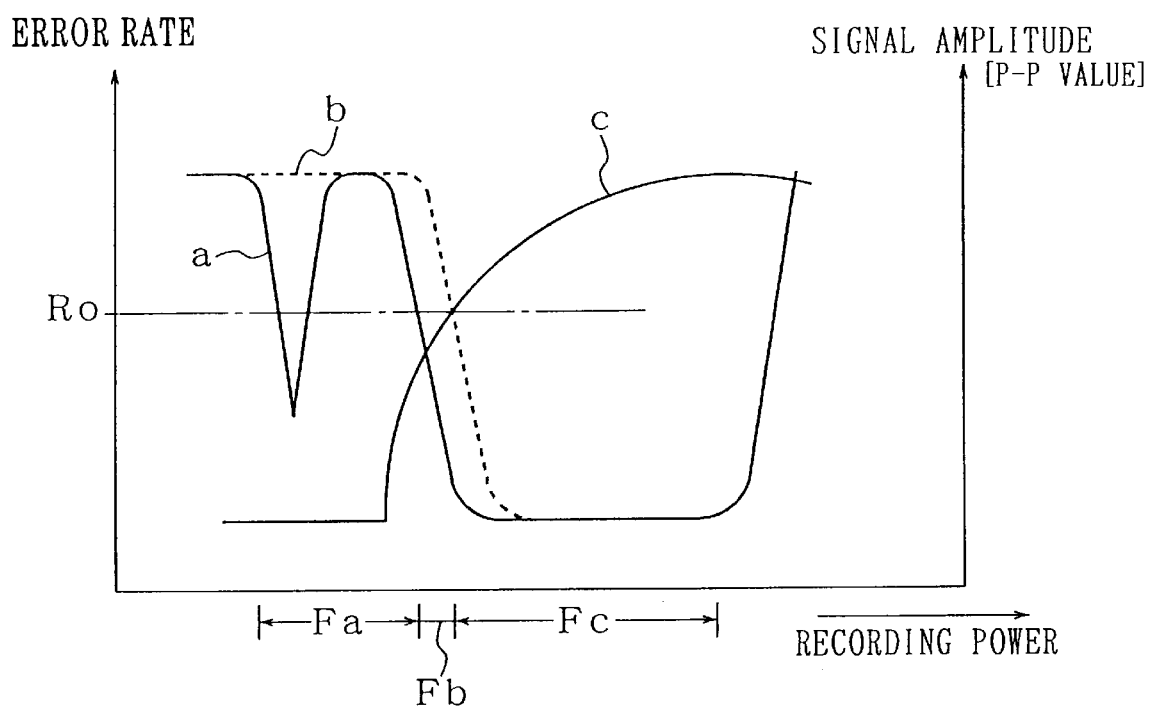
FIG. 7 is a diagram illustrating the relationship between recording power, an error rate of a reproduced signal and the amplitude of the signal.

Upon the recording referred to above, the system controller 30 operates along a flowchart shown in FIG. 4.

In Step ST1, N is first set equal to 0 (N=0). Further, the writing of data is executed in Step ST2. In this case, the ECC circuit 33 effects an error-correction code adding process on written data outputted from the host computer, which is received by the SCSI interface 32 and stored in the data buffer 31. Further, the data modulator 34 effects a modulating process on the data. Next, the SYNC·RESYNC addition circuit 35 adds SYNC bytes and RESYNC bytes to data outputted from the data modulator 34 to create record data Dr.

Thereafter, the record data Dr is supplied via the record data buffer 36 to the laser power control circuit 25 from which a drive signal corresponding to the record data Dr is outputted. Thus, a laser beam outputted from the laser diode 14 of the optical head 13 is subjected to light-intensity modulation according to the record data Dr and thereafter a mark corresponding to the record data Dr is recorded on the WORM disc 11.

Next, the gain of the gain control amplifier (GCA) 37 and the hysteresis or window width w of the comparator 39 are placed in the verify mode in Step ST3. In Step ST4, the reading of data is executed to verify, i.e., check whether the written data is properly read out. Owing to the placement of the gain of the gain control amplifier 37 and the window width w of the comparator 39 in the verify mode, an error rate can be rendered high with respect to recording (the fact that the amplitude of a reproduced signal is reduced) at the time that recording power is placed in a bubble shaped region Fa, so that verify NG can be taken.

Next, a check is made in Step ST5 as to whether the data has been read out properly, i.e., verify is OK. Whether or not verify is OK, is determined based on detected information about RESYNC from the SYNC·RESYNC detector circuit 46 and error information outputted from the ECC circuit 33. Although the RESYNC bytes RS1 through RS39 are respectively added to the record data Dr in the respective sectors as described above, verify is regarded as OK only when 38 or more of these bytes are detected. Even if error correction can be made to an error up to 8 bytes in each correction sequence, verify is regarded as OK only in the case of an error of 2 bytes or less in each correction sequence.

When the recording power is placed in a region Fb between a bubble shaped region Fa and a normal region Fc, the amplitude of the reproduced signal is not so reduced as compared with the case where the recording power is placed in the normal region Fc. Therefore, even if the gain of the gain control amplifier 37 and the window width w of the comparator 39 are placed in the verify mode, an error rate cannot be rendered high with respect to recording at the time that the recording power lies within the region Fb. It is thus difficult to set verify as NG.

When the recording power lies within the region Fb, all the pits defined in a disc medium as marks so as to correspond to data become short as compared with the case in which the recording power is placed in the normal region Fc. Therefore, the rates at which the lengths of the pits become short, vary with mark lengths in random patterns having various mark lengths and hence the patterns are apt to cause errors. Therefore, the number of errors per correction sequence is checked and the considerable error-produced patterns are eliminated. It is thus possible to achieve high accuracy verify with respect to the random patterns. However, since each mark length becomes short on a unitary basis in a single pattern having single-type mark lengths, data might be reproduced without any error at a time immediately after recording. Therefore, only the check for the number of errors per correction sequence upon verify makes it impossible to determine, as NG, all the writing of data at the time that the recording power lies within the region Fb.

As described above, the RESYNC bytes are, e.g., data having the minimum and maximum inversion intervals. The detected number of RESYNC is reduced depending on the writing of data at the time that the recording power lies within the region Fb. Therefore, the decision as to whether or not verify is OK, is made based on the detected information about RESYNC from the SYNC·RESYNC detector circuit 46 as well as on the error information outputted from the ECC circuit 33. As a result, verify can be taken as NG with reliability with respect to the recording at the time that the recording power lies within the region Fb.

If verify is found to be OK in Step ST5, then the gain of the gain control amplifier 37 and the window width w of the comparator 39 are returned to the normal mode in Step ST6 and thereafter the data write operation is normally completed or ended in Step ST7.

If verify is found not to be OK in Step ST5, then a decision as to whether N=No is made in Step ST8. For example, No is set equal to 3 (No=3). If the answer is found not to be N=No in Step ST8, then N is incremented in Step ST9 and a defect process for writing data into another region or area (alternate region) is executed in Step ST10 and the rewriting of the data therein is executed. Thereafter, the routine procedure is returned to Step ST4 where the reading of data for verify is executed.

When N=No and verify is not determined as OK even if the rewriting of data No times is performed in Step ST8, it is determined in Step ST11 whether the resetting of recording conditions such as the resetting of the recording power, based on calibration is allowed. If the resetting of the recording conditions is permitted, then the recording conditions are reset in Step ST12 and thereafter the routine procedure is returned to Step ST11 where the operation similar to above is executed. On the other hand, when the recording conditions have already been reset and the resetting beyond it is not allowed, the gain of the gain control amplifier 37 and the window width w of the comparator 39 are returned to the normal mode in Step ST13 and thereafter the data write operation is terminated or ended as abnormal in Step ST14.

In the present embodiment as described above, upon the on-recording operation, the gain of the gain control amplifier 37 is set so as to be smaller than normal and the window width of the comparator 39 is set so as to be larger than normal, upon verify for checking whether the written data can be properly read out. Thus, since the amplitude of the reproduced signal is reduced when the recording power falls within the bubble shaped region Fa, an error rate is rendered high and verify can be enhanced.

FIGS. 5A and 5B respectively typically show the relationship between the amplitude of the reproduced signal and the window width w of the comparator 39 at the time that the gain of the gain control amplifier 37 and the window width w of the comparator 39 are placed in the normal mode and the recording power falls within the bubble shaped region Fa and the normal region Fc. In this case, even if the recording power is placed in the bubble shaped region Fa, the window width w is smaller than the high-frequency amplitude of the reproduced signal and the reproduced signal is satisfactorily brought into binary form by the comparator 39.

On the other hand, FIGS. 6A and 6B respectively typically illustrate the relationship between the amplitude of a reproduced signal and the window width w of the comparator 39 at the time that the gain of the gain control amplifier 37 and the window width w of the comparator 39 are placed in the verify mode and the recording power lies within the bubble shaped region Fa and the normal region Fc. In this case, when the recording power is placed in the bubble shaped region Fa, the window width w becomes greater than the high-frequency amplitude of the reproduced signal and the reproduced signal is not satisfactorily brought into binary form by the comparator 39.

Further, the decision as to whether or not verify is OK, is made upon verify on the basis of the detected information about RESYNC from the SYNC·RESYNC detector circuit 46 as well as the error information from the ECC circuit 33. Thus, even with respect to the recording at the time that the recording power lies within the region Fb between the bubble shaped region Fa and the normal region Fc, verify can be reliably taken as NG and hence the accuracy of verify can be improved.

Incidentally, the gain of the gain control amplifier 37 is set smaller than normal and the window width w of the comparator 39 is set greater than normal upon verify in the aforementioned embodiment. However, either one of them may be controlled and thereby the error rate can be increased with respect to recording at the time that the recording power is placed in the bubble shaped region Fa.

In the aforementioned embodiment, the decision as to whether or not verify is OK, is made upon verify, based on the detected information about RESYNC from the SYNC·RESYNC detector circuit 46 as well as the error information from the ECC circuit 33. However, either one of the affirmative and negative events is considered to be executed.

In the above-described embodiment, the present invention is applied to the WORM disc drive device. It is however needless to say that the present invention is applicable to other disc drive devices such as a magneto-optic disc, etc.

According to the present invention, when verify for checking whether or not data written into a disc medium can be properly read, is done, an amplification factor of a reproduced signal is set smaller than usual and a window width w of a comparator for bringing the signal into binary form is set greater than normal, for example. Further, a verify check is made based on the detected number of synchronous pattern codes from the reproduced signal as well as error information about read data. Thus, the accuracy of verify can be greatly enhanced.

While the preferred embodiment of the present invention has been described above, the description of these is illustrative ones. It should be understood that modifications and changes from these description can be made without departing from the spirit and scope of the following claims.

What is claimed is:

1. A disc drive device, comprising:
    data writing means for recording marks corresponding to data on a disc medium to thereby write the data therein;
    data reading means for reading the data, based on the marks recorded on the disc medium; and
    verify means for checking pattern codes to determine whether the marks written into the disc medium by said data writing means are capable of being properly read out by said data reading means,
    said data reading means comprising,
        signal reproducing means for obtaining a reproduced signal from the corresponding marks recorded on the disc medium by an optical head;
        amplifying means for amplifying the reproduced signal;
        a window comparator for bringing a signal outputted from said amplifying means into binary form;
        reproduced signal processing means for processing a signal outputted from said window comparator to thereby obtain read data; and
        control means for controlling the gain of said amplifying means so as to be smaller than that at the time of normal data reproduction when said verify means performs said check.

2. A disc drive device according to claim 1, wherein said pattern codes are synchronous pattern codes, and marks written into the disc medium by said data writing means are provided with a plurality of the synchronous pattern codes in distributed form, said data reading means further comprises code detecting means for detecting the synchronous pattern codes in response to the signal outputted from said window comparator, and said verify means performs said check based on the number of the synchronous pattern codes detected by said code detecting means.

3. A disc drive device according to claim 1, wherein said reproduced signal processing means has error correction processing means for correcting errors in the read data, and said verify means performs said check based on error information about the read data supplied from said error correction processing means.

4. A disc drive device, comprising:
    data writing means for recording marks corresponding to data on a disc medium to thereby write the data therein;
    data reading means for reading the data, based on the marks recorded on the disc medium; and
    verify means for checking whether the marks written into the disc medium by said data writing means are capable of being properly read out by said data reading means,
    said data written into the disc medium by said data writing means being provided with a plurality of synchronous pattern codes in distributed form,
    said data reading means comprising,
        signal reproducing means for obtaining a reproduced signal from the marks recorded on the disc medium by an optical head;
        amplifying means for amplifying the reproduced signal;
        digitizing means for bringing a signal outputted from said amplifying means into binary form;
        code detecting means for detecting the synchronous pattern codes in response to a signal outputted from said digitizing means; and
        reproduced signal processing means for processing the output signal of said digitizing means to thereby obtain read data,
    said verify means performing said check based on a number of the synchronous pattern codes detected by said code detecting means.

5. A disc drive device, comprising:
    data writing means for recording marks corresponding to data on a disc medium to thereby write the data therein;
    data reading means for reading the data, based on the marks recorded on the disc medium; and verify means for checking pattern codes to determine whether the marks written into the disc medium by said data writing means are capable of being properly read out by said data reading means, said data reading means comprising, signal reproducing means for obtaining a reproduced signal from the corresponding marks recorded on the disc medium by an optical head;

amplifying means for amplifying the reproduced signal;

a window comparator for bringing a signal outputted from said amplifying means into binary form;

reproduced signal processing means for processing a signal outputted from said window comparator to thereby obtain read data; and control means for controlling a window width of said comparator so as to be greater than that at the time of normal data reproduction when said verify means performs said check.

6. A disc drive device according to claim 2, wherein said pattern codes are synchronous pattern codes, and marks written into the disc medium by said data writing means are provided with a plurality of the synchronous pattern codes in distributed form, said data reading means further comprises code detecting means for detecting the synchronous pattern codes in response to the signal outputted from said window comparator, and said verify means performs said check based on the number of the synchronous pattern codes detected by said code detecting means.

7. A disc drive device according to claim 5, wherein said control means controls the gain of said amplifying means so as to be smaller than normal as well as to control the window width of said window comparator so as to be greater than normal when said verify means performs said check.

8. A disc drive device according to claim 7, wherein said pattern codes are synchronous pattern codes and marks written into the disc medium by said data writing means are provided with a plurality of the synchronous pattern codes in distributed form, said data reading means further comprises code detecting means for detecting the synchronous pattern codes in response to the signal outputted from said window comparator, and said verify means performs said check based on the number of the synchronous pattern codes detected by said code detecting means.

9. A disc drive device according to claim 8, wherein said reproduced signal processing means has error correction processing means for correcting errors in the read data, and said verify means performs said check based on error information about the read data supplied from said error correction processing means.

10. A disc drive device according to claim 7, wherein said reproduced signal processing means has error correction processing means for correcting errors in the read data, and said verify means performs said check based on error information about the read data supplied from said error correction processing means.

11. A disc drive device according to claim 5, wherein said reproduced signal processing means has error correction processing means for correcting errors in the read data, and said verify means performs said check based on error information about the read data supplied from said error correction processing means.

12. A recording and reproducing device for recording data on a disc medium and reproducing the data from the recording medium, comprising:

data recording means for recording marks on the disc medium;

data reproducing means for reproducing, based on the marks recorded on the disc medium, the data recorded on the disc medium;

verify means for checking pattern codes to determine whether the marks written into the disc medium by said data recording means are capable of being properly read by said data reproducing means; and control means for controlling said verify means by setting at least one of a gain of an amplifying means for amplifying a signal and a predetermined window width of a window comparator in order to prevent the data recorded on the disc medium from being incapable of being read due to a phase change incident to a change over time after the recording of the marks on the disc medium.

13. A recording and reproducing device according to claim 12, wherein said control means controls the gain of the amplifying means for amplifying the signal reproduced by said data reproducing means so that the gain thereof is smaller than the gain at normal data reproduction.

14. A recording and reproducing device according to claim 12, wherein said control means controls the window width of the window comparator for bringing the signal reproduced by said data reproducing means into binary form so that the window width thereof is greater than the window width at normal reproduction for reproducing the data.

15. A recording and reproducing device according to claim 12, wherein said control means establishes at least one of the gain and window width based on the number of synchronous pattern codes extracted from the signal reproduced by said data reproducing means.

16. A method of verifying data, comprising the steps of:

recording marks corresponding to data on a disc medium to thereby write the data therein;

reading the data, based on the marks recorded on the disc medium; and checking pattern codes to determine whether the marks written into the disc medium by said data writing means are capable of being properly read out, said step of reading the data comprising steps of, obtaining a reproduced signal from corresponding marks recorded on the disc medium;

amplifying the reproduced signal;

comparing the amplified reproduced signal to generate a binary form of the reproduced signal;

processing the binary form of the reproduced signal to thereby obtain read data; and controlling the amplification of the reproduced signal so as to be smaller when checking said pattern codes than the amplification at the time of normal data reproduction.

17. A method of verifying data according to claim 16, wherein said pattern codes are synchronous pattern codes and marks written into the disc medium are provided with a plurality of the synchronous pattern codes in distributed form, wherein said step of reading the data further comprising the step of:

detecting the synchronous pattern codes in response to the binary form of the reproduced signal, wherein said step of checking pattern codes performs said check based on the number of the synchronous pattern codes detected.

18. A method of verifying data according to claim 16, wherein said step of processing corrects errors in the read data, and said step of checking pattern codes is based on error information about the read data supplied from said step of processing.

19. A method of verifying data, comprising the steps of:

recording marks corresponding to data on a disc medium to thereby write the data therein;

reading the data based on the marks recorded on the disc medium; and checking whether the marks written into the disc medium are capable of being properly read out, said data written into the disc medium being provided with a plurality of a synchronous pattern codes in distributed form, said step of reading the data comprising the steps of, obtaining a reproduced signal from the marks recorded on the disc medium;

amplifying the reproduced signal;

digitizing the amplified reproduced signal into binary form;

detecting the synchronous pattern codes in response to said binary form; and processing the binary form of the reproduced signal to thereby obtain read data, and performing said check based on the number of the synchronous pattern codes detected.

20. A method of verifying data, comprising the steps of:

recording marks corresponding to data on a disc medium to thereby write the data therein;

reading the data, based on the marks recorded on the disc medium; and checking pattern codes to determine whether the marks written into the disc medium are capable of being properly read out, said step of reading the data, comprising the steps of, obtaining a reproduced signal from the corresponding marks recorded on the disc medium;

amplifying the reproduced signal;

comparing the amplified reproduced signal to generate a binary form of the reproduced signal;

processing the binary form of the reproduced signal to thereby obtain read data; and controlling a window width of said step of comparing so as to be greater when checking pattern codes than the window width at the time of normal data reproduction.

21. A method of verifying data according to claim 17, wherein said pattern codes are synchronous pattern codes and marks written into the disc medium are provided with a plurality of the synchronous pattern codes in distributed form, wherein said step of reading the data further comprising the step of:

detecting the synchronous pattern codes in response to the binary form of the reproduced signal, wherein said step of checking pattern codes performs said check based on the number of the synchronous pattern codes detected.

22. A method of verifying data according to claim 20, wherein said step of processing corrects errors in the read data, and said step of checking pattern codes is based on error information about the read data supplied from said step of processing.

23. A method of verifying data according to claim 20, further comprising the steps of:

controlling an amount of the amplification of the reproduced signal when checking pattern codes so as to be smaller than normal; and controlling the window width of said step of comparing when checking pattern codes so as to be greater than normal.

24. A method of verifying data according to claim 23, wherein said step of processing corrects errors in the read data, and said step of checking pattern codes performs said check based on error information about the read data.

25. A method of verifying data according to claim 23, wherein said pattern codes are synchronous pattern codes and marks written into the disc medium are provided with a plurality of the synchronous pattern codes in distributed form, wherein said step of detecting detects the synchronous pattern codes in response to the binary form of the reproduced signal, and said step of checking pattern codes performs said check based on the number of the synchronous pattern codes detected.

26. A method of verifying data according to claim 25, wherein said step of processing corrects errors in the read data, and said step of checking pattern codes performs said check based on error information about the read data.

27. A method of recording data on a disc medium and reproducing the data from the recording medium, comprising the steps of:

recording marks on the disc medium to thereby write the data therein;

reading the data based on the marks recorded on the disc medium to generate a signal representative of the data;

verifying, by checking pattern codes, whether the marks written into the disc medium are capable of being properly read; and controlling said step of verifying at least one of an amount by which the signal is amplified and a predetermined window width with which the signal is compared, in order to prevent the data recorded on the disc medium from being incapable of being read due to a phase change incident to a change over time after the recording of the marks on the disc medium.

28. A method of recording and reproducing data according to claim 27, wherein the amount by which the signal is amplified is controlled so as to be smaller than the amount during normal reproduction.

29. A method of recording and reproducing data according to claim 27, wherein the window width under which the signal is compared is controlled so as to be greater than the window width during normal reproduction.

30. A method of recording and reproducing according to claim 27, wherein at least one of the amount of amplification and window width is based on the number of synchronous pattern codes extracted from the signal.

* * * * *